(12) United States Patent
Morii et al.

(10) Patent No.: US 11,859,969 B2
(45) Date of Patent: Jan. 2, 2024

(54) MEASUREMENT DEVICE

(71) Applicant: Tokyo Seimitsu Co., Ltd., Tokyo (JP)

(72) Inventors: Hideki Morii, Tsuchiura (JP); Takuya Inoue, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 46 days.

(21) Appl. No.: 17/976,612

(22) Filed: Oct. 28, 2022

(65) Prior Publication Data

US 2023/0052870 A1 Feb. 16, 2023

Related U.S. Application Data

(63) Continuation of application No. PCT/JP2021/006600, filed on Feb. 22, 2021.

(30) Foreign Application Priority Data

Apr. 30, 2020 (JP) .................................. 2020-080058

(51) Int. Cl.
  *G01B 5/00* (2006.01)
  *G01B 3/00* (2006.01)
  (Continued)

(52) U.S. Cl.
  CPC ........... *G01B 5/0014* (2013.01); *G01B 3/004* (2013.01); *G01B 3/563* (2013.01); *G01B 5/14* (2013.01); *G01B 5/20* (2013.01); *G01B 5/28* (2013.01)

(58) Field of Classification Search
  CPC ...... G01B 5/0014; G01B 3/004; G01B 3/563; G01B 5/14; G01B 5/20; G01B 5/28
  See application file for complete search history.

(56) References Cited

U.S. PATENT DOCUMENTS 5,131,166 A * 7/1992 Weber .................... G01B 21/04
  33/832
6,772,529 B1 * 8/2004 McGrath .................. G01B 5/20
  33/551
(Continued)

FOREIGN PATENT DOCUMENTS

DE  112012006115 B4  3/2016
DE  102017107373 A1 * 10/2018  ............. F16H 25/20
(Continued)

OTHER PUBLICATIONS

International Search Report for PCT/JP2021/006600 (PCT/ISA/210) dated May 18, 2021.
(Continued)

*Primary Examiner* — Yaritza Guadalupe-McCall
(74) *Attorney, Agent, or Firm* — Birch, Stewart, Kolasch & Birch, LLP

(57) ABSTRACT

A measurement device includes: a probe part including a probe configured to measure a surface of an object to be measured and is attached so as to swing around a swing center according to a shape of the surface of the object to be measured; a scale configured to measure displacement by swinging of the probe part; a scale head configured to read a scale mark of the scale; and an arm part to which the probe part is attached, the arm part is attached so as to swing around the swing center integrally with the probe part, and the scale is attached to the arm part. When thermal expansion coefficients of the probe part, the arm part and the scale are $\alpha$, $\beta$ and $\gamma$ respectively, the measurement device satisfies a condition of $(\alpha+\gamma)-1/2\alpha \leq \beta \leq (\alpha+\gamma)+1/2\alpha$.

5 Claims, 6 Drawing Sheets

(51) Int. Cl.
*G01B 3/56* (2006.01)
*G01B 5/14* (2006.01)
*G01B 5/20* (2006.01)
*G01B 5/28* (2006.01)

(56) References Cited

U.S. PATENT DOCUMENTS

| | | | |
|---|---|---|---|
| 6,874,243 B2* | 4/2005 | Hama | G01B 5/28 |
| | | | 33/551 |
| 9,151,588 B2* | 10/2015 | Sakurada | G01B 5/201 |
| 10,837,752 B2* | 11/2020 | Mayinger | G01B 11/30 |
| 11,454,487 B2* | 9/2022 | Schwarzer | G01B 5/20 |
| 2004/0027141 A1* | 2/2004 | Oguri | G01B 5/28 |
| | | | 324/716 |
| 2012/0029857 A1 | 2/2012 | Ono et al. | |
| 2014/0331511 A1 | 11/2014 | Yamauchi et al. | |
| 2015/0025844 A1* | 1/2015 | Mansfield | G01D 18/00 |
| | | | 702/167 |
| 2015/0025845 A1* | 1/2015 | Mansfield | G01D 5/347 |
| | | | 702/168 |
| 2020/0003542 A1 | 1/2020 | Ishioka et al. | |
| 2020/0355485 A1* | 11/2020 | Schwarzer | G01B 5/20 |

FOREIGN PATENT DOCUMENTS

| | | |
|---|---|---|
| JP | 2001-21304 A | 1/2001 |
| JP | 2004-69510 A | 3/2004 |
| JP | 2012-53033 A | 3/2012 |
| JP | 2018009837 A * | 1/2018 |
| JP | 2020-3436 A | 1/2020 |
| WO | WO-2021220595 A1 * | 11/2021 |

OTHER PUBLICATIONS

Written Opinion of the International Searching Authority for PCT/JP2021/006600 (PCT/ISA/237) dated May 18, 2021.
Office Action issued in corresponding German Application No. 112021002520.1 dated Jun. 15, 2023, with machine translation.

* cited by examiner

RELATED ART

MEASUREMENT DEVICE

CROSS-REFERENCE TO RELATED APPLICATIONS

The present application is a Continuation of PCT International Application No. PCT/JP2021/006600 filed on Feb. 22, 2021 claiming priority under 35 U.S.C § 119(a) to Japanese Patent Application No. 2020-080058 filed on Apr. 30, 2020. Each of the above applications is hereby expressly incorporated by reference, in their entirety, into the present application.

BACKGROUND OF THE INVENTION

Field of the Invention

The presently disclosed subject matter relates to a measurement device and relates in particular to a measurement device for measuring a shape, roughness or a contour or the like of a surface of an object to be measured.

Description of the Related Art

A measurement device for measuring a shape, roughness or a contour or the like of a surface of an object to be measured has been known. For example, Patent Literature 1 discloses a surface property measurement device that measures a surface property of a measurement target surface of an object to be measured by bringing a stylus projectingly provided on a distal end of a measurement arm into contact with the measurement target surface of the object to be measured to perform scanning and detecting minute vertical movements of the stylus. In the surface property measurement device described in Patent Literature 1, the measurement arm is supported so as to swing (move in a circular arc) in an up-down direction with a rotary shaft as a fulcrum. Then, a rotation angle by swinging of the measurement arm is detected by using a scale having a scale mark along a swing direction of the measurement arm.

Patent Literature 1: Japanese Patent Application Laid-Open No. 2020-003436

SUMMARY OF THE INVENTION

In the measurement device described above, when an ambient temperature changes, a length of the measurement arm changes due to thermal expansion. Therefore, there is a problem that a measurement result of displacement of the stylus fluctuates due to the ambient temperature.

The presently disclosed subject matter is implemented in consideration of such a circumstance, and it is an object to provide a measurement device capable of suppressing influence exerted on a measurement result by an ambient temperature.

In order to solve the problem described above, a measurement device according to a first aspect of the presently disclosed subject matter includes: a probe part including a probe configured to measure a surface of an object to be measured and is attached so as to swing around a swing center according to a shape of the surface of the object to be measured; a scale configured to measure displacement by swinging of the probe part; a scale head configured to read a scale mark of the scale; and an arm part to which the probe part is attached, the arm part is attached so as to swing around the swing center integrally with the probe part, and the scale is attached to the arm part, and when thermal expansion coefficients of the probe part, the arm part and the scale are $\alpha$, $\beta$ and $\gamma$ respectively, the measurement device satisfies a condition of $(\alpha+\gamma)-\frac{1}{2}\alpha \leq \beta \leq (\alpha+\gamma)+\frac{1}{2}\alpha$.

A measurement device according to a second aspect of the presently disclosed subject matter is configured such that, in the first aspect, the thermal expansion coefficients of the probe part, the arm part and the scale satisfy a condition of $\beta=\alpha+\gamma$.

A measurement device according to a third aspect of the presently disclosed subject matter is configured such that, in the first or second aspect, the scale is a circular arc scale formed in a circular arc shape along a swing direction of the arm part.

A measurement device according to a fourth aspect of the presently disclosed subject matter is configured such that, in any one of the first to third aspects, at least one of the probe part, the arm part and the scale is formed of a plurality of members having different thermal expansion coefficients, and materials and lengths of the plurality of members are adjusted so as to satisfy the condition.

A measurement device according to a fifth aspect of the presently disclosed subject matter includes: a probe part including a probe configured to measure a surface of an object to be measured and attached so as to swing around a swing center according to a shape of the surface of the object to be measured; a scale configured to measure displacement by swinging of the probe part; a scale head configured to read a scale mark of the scale; an arm part to which the probe part is attached, the arm part is attached so as to swing around the swing center integrally with the probe part, and the scale is attached to the arm part; a temperature sensor configured to measure an ambient temperature; and a controller configured to calculate actual displacement $x_T$ of a distal end part of the probe part by following expressions, when thermal expansion coefficients of the probe part, the arm part and the scale are $\alpha$, $\beta$ and $\gamma$ respectively, a measured value of displacement of the distal end part of the probe part is $x_F$, and a change amount of the ambient temperature when measuring the measured value $x_F$ is $\Delta T$.

$$x_T = c x_F$$

$$c = (1+\alpha \Delta T)/\{1+(\beta-\gamma)\Delta T\}$$

According to the presently disclosed subject matter, influence exerted on a measurement result by an ambient temperature can be suppressed.

DESCRIPTION OF THE EMBODIMENTS

Hereinafter, embodiments of a measurement device according to the presently disclosed subject matter are explained according to the attached drawings.

First Embodiment (Measurement Device)

Figure 1:
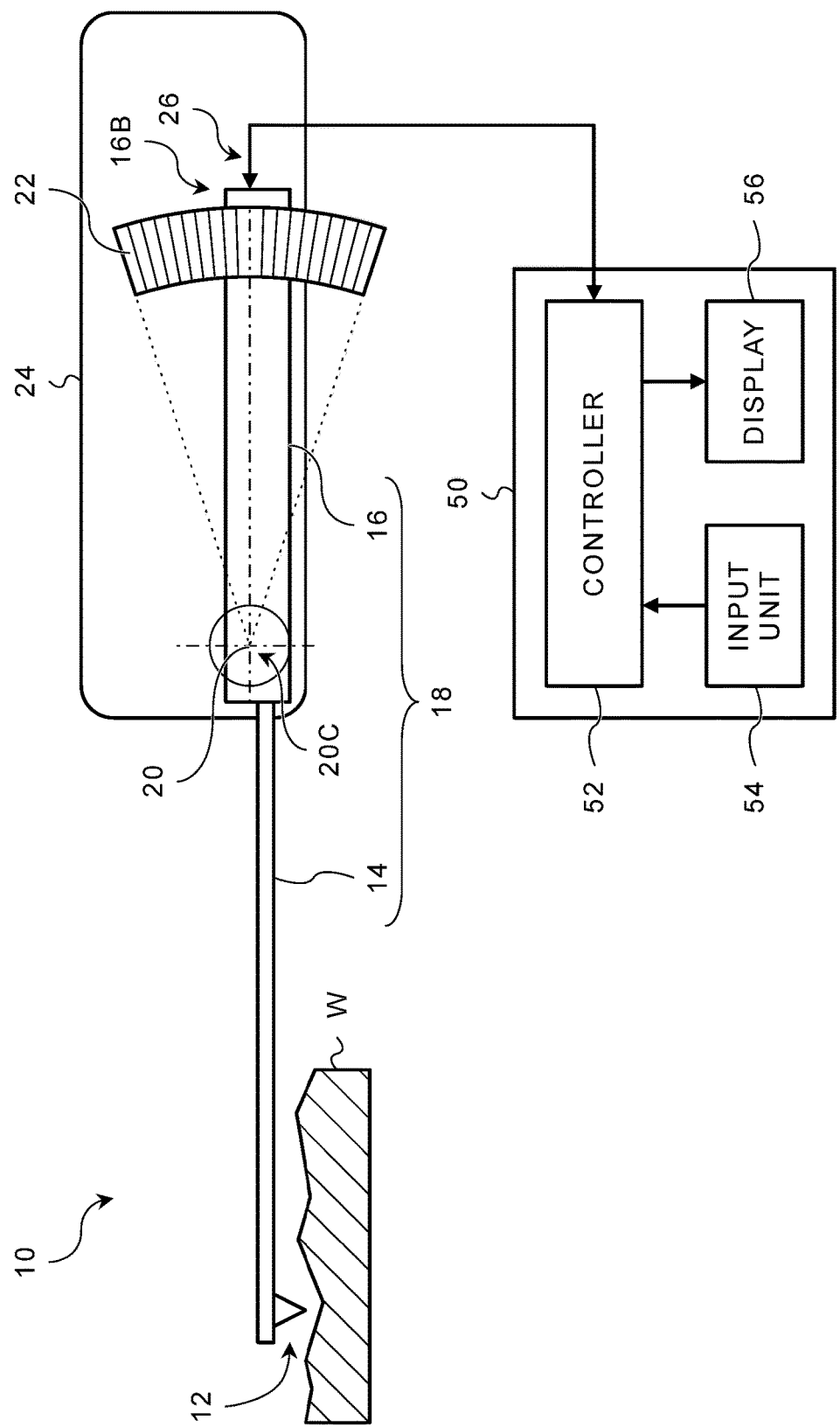
FIG. 1 is a diagram illustrating a measurement device according to a first embodiment of the presently disclosed subject matter.

First, a configuration of the measurement device according to the first embodiment of the presently disclosed subject matter is explained with reference to FIG. 1. FIG. 1 is a diagram illustrating the measurement device according to the first embodiment of the presently disclosed subject matter. In the following explanation, a three-dimensional orthogonal coordinate system for which an XY plane is a horizontal plane and a Z direction is a vertical direction (perpendicular direction) is used.

A measurement device 10 is a device for measuring a shape, roughness or a contour or the like of a surface of an object W to be measured. The measurement device 10 is attached to a column (not illustrated) and is made movable in XYZ directions to the column by an actuator (not illustrated) provided on the column. The column to which the measurement device 10 is attached is fixed to a table (not illustrated) where the object W to be measured is to be mounted.

As illustrated in FIG. 1, the measurement device 10 includes a probe part 14, an arm part 16, a swing shaft 20, a scale 22, a swing shaft fixing part 24 and a scale head 26. Here, illustrations of the exterior (casing or the like) of the measurement device 10 are omitted.

The probe part 14 is fixed so as to be roughly straight to the arm part 16. The probe part 14 and the arm part 16 are attached so as to integrally swing around the swing shaft 20 fixed to the swing shaft fixing part 24. For the swing shaft 20, an attaching angle to the column of the measurement device 10 is adjusted so as to be roughly parallel to the XY plane. Hereinafter, the probe part 14 and the arm part 16 are referred to as a swing part 18. Here, the configuration of the swing part 18 is not limited to an example of being roughly straight as illustrated in FIG. 1. For example, the probe part 14 or the arm part 16 may have an L-shaped bend part and the probe part 14 and the arm part 16 may be attached so as to be roughly parallel.

On a distal end of the probe part 14, a probe 12 is provided. The probe 12 extends in a lower direction (−Z direction) in the figure. When the probe 12 is brought into contact with the surface of the object W to be measured, which is mounted on the table, with a predetermined pressure, the swing part 18 swings around the swing shaft 20 according to a height and ruggedness of the surface of the object W to be measured at a contact position. Note that the configuration of the probe part 14 is not limited to the example illustrated in FIG. 1. For example, the configuration may be a T-shaped stylus for which a probe is provided in an up-down direction in the figure of the probe part 14 or an L-shaped stylus for which a projection amount of the probe in a lower direction in the figure is longer than that in the example illustrated in FIG. 1.

To a scale attaching position 16B on a proximal end part side of the arm part 16, the scale 22 is attached, and the scale 22 is displaced according to swinging of the swing part 18. The arm part 16 is a member which connects a swing center 20C of the swing shaft 20 and the scale head 26 (which defines a distance between the swing center 20C of the swing shaft 20 and the scale head 26).

The scale 22 is a circular arc scale (angle scale) formed in a circular arc shape along a swing direction of the arm part 16, and scale markers indicating a rotation angle (corresponding to a scale head detection angle $\phi$ in FIG. 2) of the scale 22 are formed along a circular arc direction of the scale 22. The scale 22 is attached so that a center (zero point) of the scale markers of the scale 22 coincides with a scale head read point (read position) to be read by the scale head 26, in the case where the swing part 18 is horizontal (hereinafter, referred to as a reference position).

The scale head 26 is a device which reads displacement of the scale 22 according to the swinging of the swing part 18. While a kind of the scale head 26 is not limited in particular, as the scale head 26, for example, a photoelectric sensor or a non-contact type sensor including an imaging element for reading the scale marker may be used.

In the present embodiment, materials of individual members are selected so as to satisfy a condition of $\beta=\alpha+\gamma$ in the case where the thermal expansion coefficients (linear thermal expansion coefficients) of the probe part 14, the arm part 16 and the scale 22 are $\alpha$, $\beta$ and $\gamma$ respectively (details are to be described later).

To the measurement device 10, a control device 50 is connected, and the displacement of the scale 22 read by the scale head 26 is outputted to the control device 50. The control device 50 controls the actuator provided on the column, and acquires a detection signal for the displacement at each position on the surface of the object W to be measured while relatively moving the object W to be measured and the probe 12 of the measurement device 10. Thus, the shape, roughness or contour or the like of the surface of the object W to be measured can be measured.

As illustrated in FIG. 1, the control device 50 includes a controller 52, an input unit 54 and a display 56. As the control device 50, for example, a personal computer or a workstation or the like may be used.

The controller 52 includes a CPU (Central Processing Unit) for controlling the individual units of the control device 50, a memory (for example, a ROM (Read Only Memory)) where a control program for the control device 50 or the like is stored, and a storage (for example, an HDD (Hard Disk Drive)) where various kinds of data are stored. The controller 52 outputs control signals for controlling the individual units of the control device 50 according to operation input from the input unit 54, and outputs control signals for controlling the measurement device 10 and control signals for controlling the actuator or the like for moving the measurement device 10 or the like.

The input unit 54 is a device for receiving the operation input from an operator, and includes a keyboard, a mouse and a touch panel, for example.

The display 56 is a device for displaying images, and is an LCD (Liquid Crystal Display), for example. The display 56 displays, for example, a GUI (Graphical User Interface) for operations of the control device 50, the measurement device 10 and the actuator or the like and measurement results of the shape, roughness or contour or the like of the surface of the object W to be measured.

(Influence Exerted to Measurement Result by Ambient Temperature)

(Case where thermal expansion coefficients of arm part 16 and scale 22 are equal ($\beta=\gamma$))

Next, the configuration for suppressing influence exerted on the measurement result by the ambient temperature is explained. First, the case where the thermal expansion coefficients of the arm part 16 and the scale 22 are equal ($\beta=\gamma$), that is, the example of not satisfying the condition $\beta=\alpha+\gamma$ of the present embodiment is explained with reference to FIG. 2.

Figure 2:
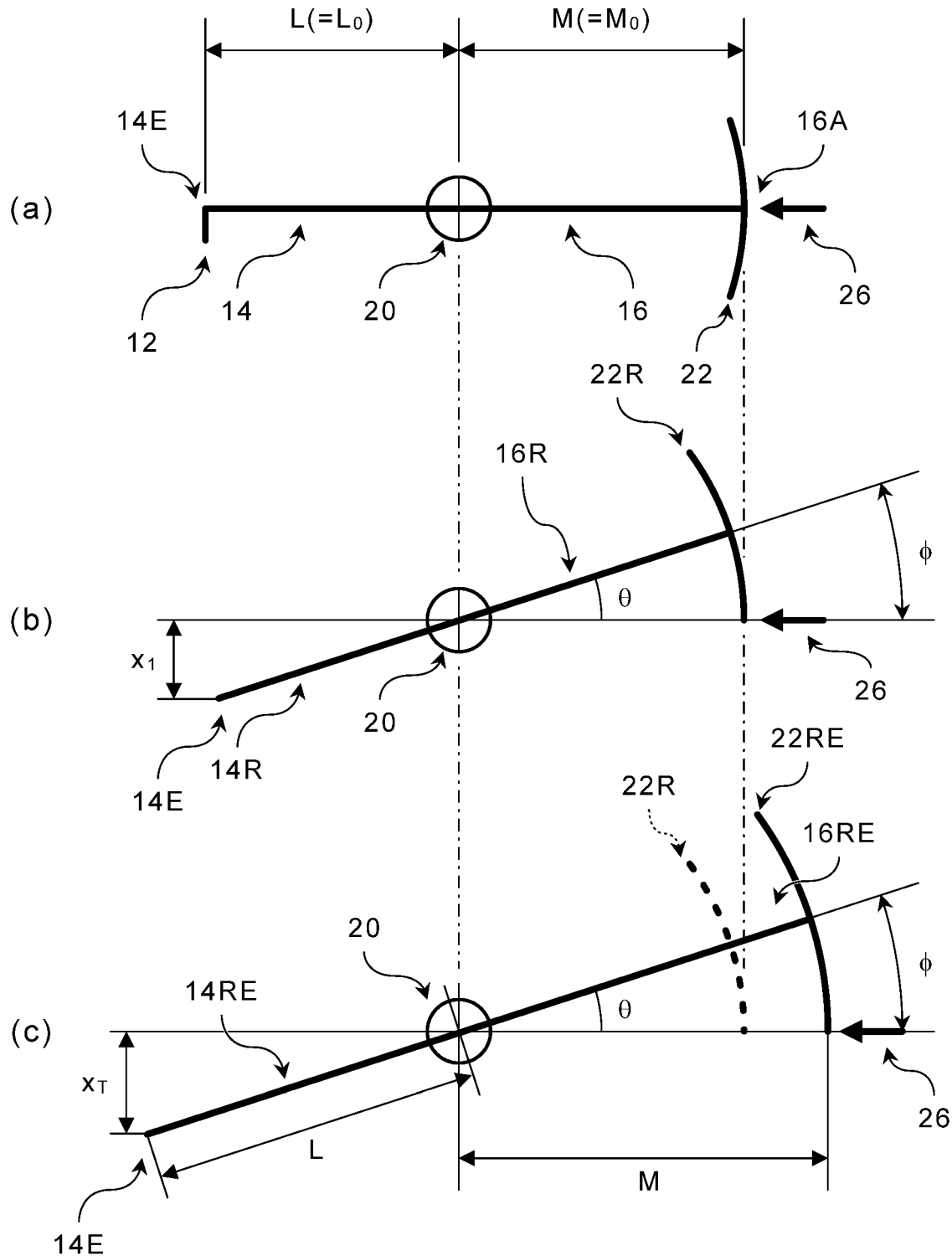
FIG. 2 is a diagram illustrating a case where thermal expansion coefficients of an arm part and a scale are equal.

FIG. 2 is a diagram illustrating the case where the thermal expansion coefficients of the arm part 16 and the scale 22 are equal ($\beta=\gamma$). In FIG. 2, the movements of the individual parts of the measurement device 10 are simplified and illustrated.

Portion (a) of FIG. 2 illustrates a state where an axis AX of the swing part 18 is horizontal (reference position $\theta=0$), and portions (b) and (c) of FIG. 2 illustrate the state where the swing part 18 is inclined by an angle $\theta$ from the reference position. Then, portion (c) of FIG. 2 illustrates the state where the arm part 16 and the swing part 18 are thermally expanded in portion (b) of FIG. 2.

When an ambient temperature T is a reference temperature $T_0$, a distance L from a distal end part 14E (position corresponding to a distal end position of the probe 12 in contact with the surface of the object W to be measured) of the probe part 14 to the swing center 20C of the swing part 18 is defined as $L_0$, and a distance M from the swing center 20C of the swing part 18 to the scale attaching position 16B of the arm part 16 is defined as $M_0$.

As illustrated in portion (b) of FIG. 2, in the case where the ambient temperature T is the reference temperature $T_0$ (the case where there is no thermal expansion), when the swing part 18 is inclined by the angle $\theta$ from the reference position and the probe part 14, the arm part 16 and the scale 22 move to positions of signs 14R, 16R and 22R respectively, the scale head detection angle $\phi$ is equal to a rotation angle $\theta$ from the reference position of the arm part 16. In this case, displacement $x_1$ of the distal end part 14E of the probe part 14 is expressed by an expression (1) below.

$$x_1 = L_0 \cdot \sin\theta = L_0 \cdot \sin\phi \qquad (1)$$

When the expression (1) is generalized without considering the thermal expansion, a computation expression of displacement $x_F$ of the distal end part 14E of the probe part 14 is expressed by an expression (2) below.

$$x_F = L_0 \cdot \sin\phi \qquad (2)$$

As illustrated in portion (c) of FIG. 2, when the ambient temperature T changes to $T=T_0+\Delta T$, the probe part 14, the arm part 16 and the scale 22 are designated by signs 14RE, 16RE and 22RE respectively due to the thermal expansion. In this case, the distance L from the distal end part 14E to the swing center 20C of the swing part 18 changes as an expression (3) below.

$$L = L_0(1+\alpha\Delta T) \qquad (3)$$

At the time, actual displacement $x_T$ of the distal end part 14E of the probe part 14 is expressed by an expression (4) below.

$$x_T = L \cdot \sin\theta = L_0 \cdot \sin\theta(1+\alpha\Delta T) \qquad (4)$$

From the expression (2) and the expression (4), an error $x_{err}$ between a true value $x_T$ and a calculated value $x_F$ of the displacement of the distal end part 14E of the probe part 14 due to the change of the ambient temperature T to $T=T_0+\Delta T$ is expressed by an expression (5) below.

$$x_{err} = x_T - x_F$$

$$x_{err} = L_0 \cdot \alpha\Delta T \cdot \sin\theta \qquad (5)$$

(Case where thermal expansion coefficients of arm part 16 and scale 22 are different ($\beta\neq\gamma$))

Figure 3:
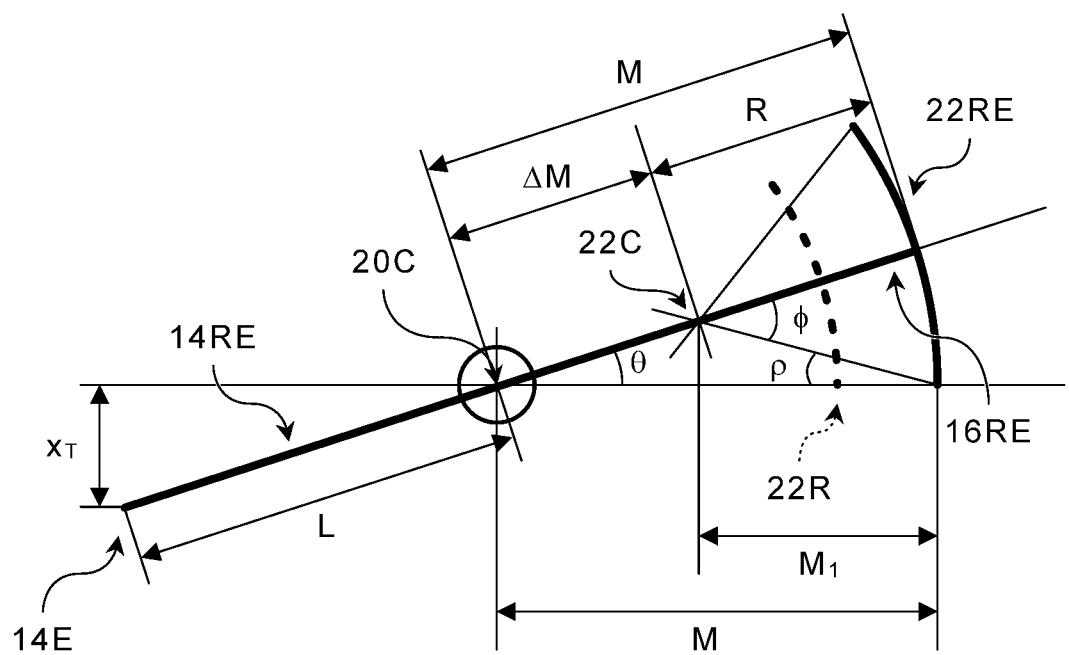
FIG. 3 is a diagram for explaining influence of thermal expansion in the case where the thermal expansion coefficients of the arm part and the scale are different.

Next, the influence of the thermal expansion in the case where the thermal expansion coefficients of the arm part 16 and the scale 22 are different ($\beta\neq\gamma$) is explained with reference to FIG. 3. FIG. 3 is a diagram for explaining the influence of the thermal expansion in the case where the thermal expansion coefficients of the arm part 16 and the scale 22 are different ($\beta\neq\gamma$).

As illustrated in FIG. 3, the thermal expansion coefficient $\beta$ of the arm part 16 and the thermal expansion coefficient $\gamma$ of the scale 22 are different ($\beta\neq\gamma$) and the scale 22 is attached to a proximal end part of the arm part 16. Therefore, an angle reference center 22C to be a reference of the angle of the scale 22 is shifted from the swing center 20C. That is, it is $\phi\neq\theta$.

When the thermal expansion is taken into consideration, the distance ($\approx$ a length of the arm part 16) M from the swing center 20C of the swing part 18 to the scale attaching position 16B of the arm part 16 is expressed by an expression (6) below.

$$M = M_0(1+\beta\Delta T) \qquad (6)$$

On the other hand, the position of the scale 22 is expanded by the thermal expansion coefficient $\gamma$ of the scale 22 with the attaching position of the scale 22 as the reference. Thus, a distance $\beta$ from the scale attaching position 16B of the arm part 16 to the angle reference center 22C is expressed by an expression (7) below.

$$R = M_0(1+\gamma\Delta T) \qquad (7)$$

When a distance between the swing center 20C and the angle reference center 22C is $\Delta M$, an expression (8) below is obtained from the expression (6) and the expression (7).

$$\Delta M = M - R$$

$$\Delta M = M_0(\beta-\gamma)\Delta T \qquad (8)$$

As illustrated in FIG. 3, when an angle $\rho$ is defined, the angles $\theta$, $\phi$ and $\rho$ satisfy a relation of $\phi=\theta+\rho$. Since $M_1 = M - \Delta M\cos\theta$ is obtained, an expression (9) below is obtained.

$$\tan\rho = \Delta M \cdot \sin\theta / M_1$$

$$\tan\rho = \Delta M \cdot \sin\theta / (M - \Delta M \cdot \cos\theta) \qquad (9)$$

When approximation for which $\rho$ and $\theta$ are minute angles is used, an expression (10) below is obtained.

$$\rho \approx \Delta M \cdot \sin\theta / M_0 = (\beta-\gamma)\Delta T \qquad (10)$$

When a computation expression (2) for the displacement $x_F$ of the distal end part 14E of the probe part 14 is transformed using the expression (10), it is transformed as follows.

$$x_F = L_0 \cdot \sin\phi$$

$$x_F = L_0 \cdot \sin(\theta+\rho)$$

$$x_F = L_0(\sin\theta\cos\rho + \cos\theta\sin\rho)$$

When the approximation for which $\rho$ is the minute angle is used, an expression (11) below is obtained.

$$x_F \approx L_0(\sin\theta + \rho\cos\theta)$$

$$x_F \approx L_0 \sin\theta\{1+(\beta-\gamma)\Delta T\cos\theta\} \qquad (11)$$

On the other hand, since the actual displacement $x_T$ is obtained by the expression (4), the error $x_{err}$ is expressed by an expression (12) below.

$$x_{err} = x_T - x_F$$

$$x_{err} = L_0 \cdot \sin\theta(1+\alpha\Delta T) - L_0 \cdot \sin\theta\{1+(\beta-\gamma)\Delta T\cos\theta\}$$

$$x_{err} = L_0\Delta T \cdot \sin\theta\{\alpha-(\beta-\gamma)\cos\theta\} \qquad (12)$$

Here, when the condition of $\beta=\alpha+\gamma$ is satisfied, an expression (13) below is obtained.

$$x_{err}=L_0\Delta T\alpha\cdot\sin\theta\{1-\cos\theta\} \quad (13)$$

Thus, while the error $x_{err}$ in the case of not satisfying the condition $\beta=\alpha+\gamma$ of the present embodiment (expression (5)) is $x_{err}=L_0\cdot\alpha\Delta T\cdot\sin\theta$ (the case of $\beta=\gamma$), $x_{err}$ in the case of satisfying the condition described above is $x_{err}=L_0\Delta T\alpha\cdot\sin\theta\{1-\cos\theta\}$.

Generally, a detection range in the measurement device 10 is near $\theta=0°$. At the time, it is $(1-\cos\theta)\ll 1$. Thus, by selecting the materials of the individual members so as to satisfy the condition of $\beta=\alpha+\gamma$, the error $x_{err}$ between the true value $x_T$ and the calculated value $x_F$ of the displacement of the distal end part 14E of the probe part 14 can be substantially reduced. Accordingly, the influence exerted on the measurement result of the measurement device 10 by the ambient temperature T can be suppressed.

EXAMPLE

In the case of using carbon fiber (CFRP: Carbon Fiber Reinforced Plastics) as the material of the probe part 14, iron as the material of the scale 22 and glass as the material of the arm part 16, the thermal expansion coefficients $\alpha$, $\beta$ and $\gamma$ are $\alpha=3.6\times10^{-6}$, $\gamma=8.5\times10^{-6}$, and $\beta=12.1\times10^{-6}$. According to the above-described combination of the materials, the condition of $\beta=\alpha+\gamma$ can be satisfied.

(Modification 1)

While the thermal expansion coefficients $\alpha$, $\beta$ and $\gamma$ of the probe part 14, the arm part 16 and the scale 22 satisfy the condition of $\beta=\alpha+\gamma$ in the present embodiment, the presently disclosed subject matter is not limited thereto.

When the expression (12) is transformed, an expression (14) below is obtained.

$$x_{err}=L_0\Delta T\alpha\cdot\sin\theta\{1-\{(\beta-\gamma)/\alpha\}\cos\theta\} \quad (14)$$

When comparing the expression (5) and the expression (14), the error $x_{err}$ in the expression (14) is a value for which the expression (5) is multiplied with $\{1-\{(\beta-\gamma)/\alpha\}\cos\theta\}$.

Practically, when the error $x_{err}$ due to the change of the ambient temperature T can be reduced to $\frac{1}{2}$ or less, it can be defined that there is significant resistance to the change of the ambient temperature T.

A condition of practically useful thermal expansion coefficients is expressed by an expression (15a) below.

$$|1-\{(\beta-\gamma)/\alpha\}\cos\theta|\leq 1/2 \quad (15a)$$

Here, since the detection range in the measurement device 10 is near $\theta=0°$, when approximation to $\cos\theta\approx 1$ is performed, an expression (15b) below is obtained.

$$|1-(\beta-\gamma)/\alpha|\leq 1/2 \quad (15b)$$

When the expression (15b) is solved for R, an expression (16) below is obtained.

$$(\alpha+\gamma)-1/2\alpha\leq\beta\leq(\alpha+\gamma)+1/2\alpha \quad (16)$$

Thus, when the thermal expansion coefficient $\beta$ of the arm part 16 is within a range of $\pm\frac{1}{2}\alpha$ with $(\alpha+\gamma)$ as the reference, it can be defined that there is practically significant resistance to the change of the ambient temperature T.

(Modification 2)

While the probe part 14, the scale 22 and the swing shaft fixing part 24 are formed of a single material respectively in the present embodiment, it is also possible to adjust the thermal expansion coefficients $\alpha$, $\gamma$ and $\beta$ by combining the plurality of materials respectively.

Figure 4:
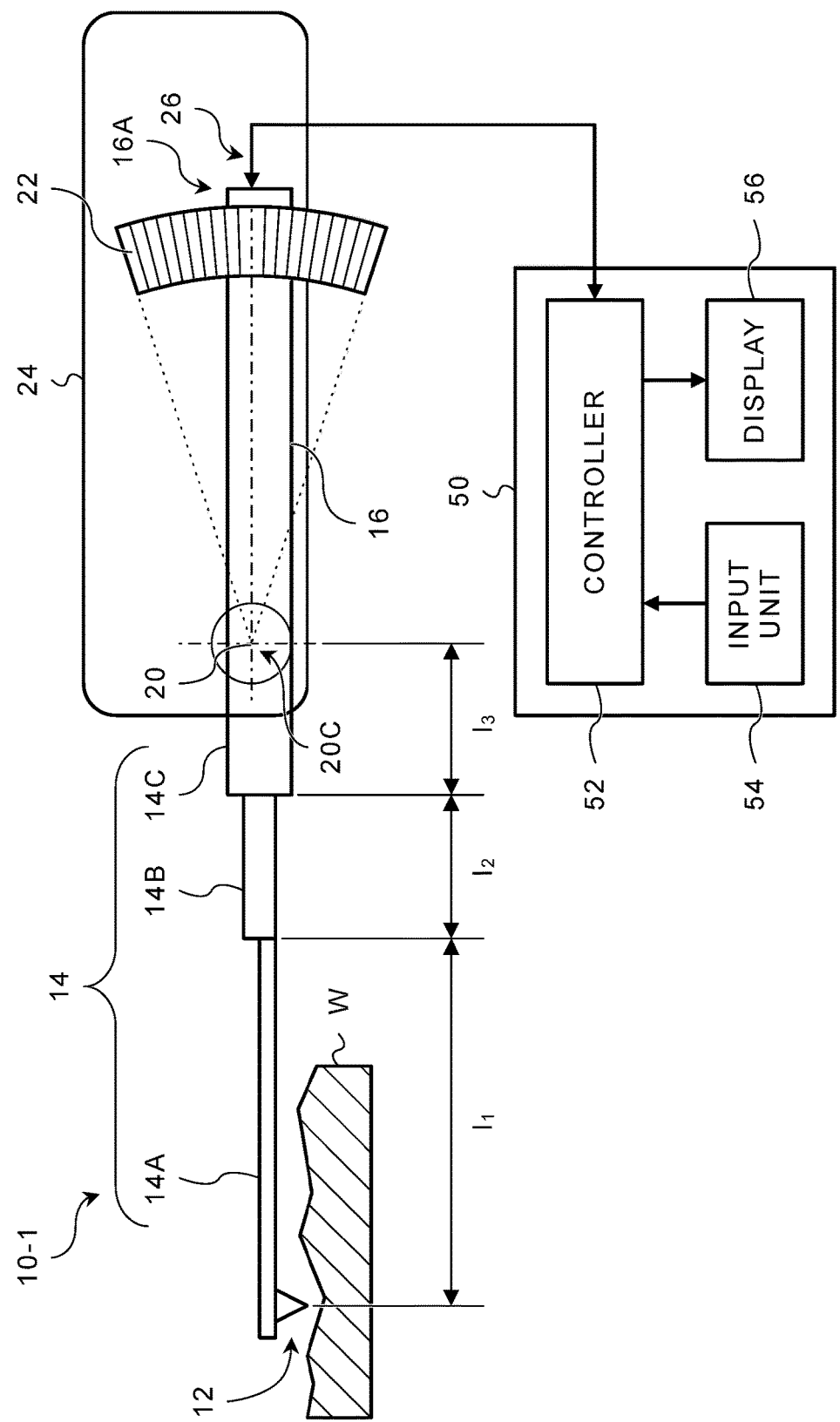
FIG. 4 is a diagram illustrating a measurement device according to a modification 2.

FIG. 4 is a diagram illustrating a measurement device according to the modification 2. In a measurement device 10-1 illustrated in FIG. 4, the probe part 14 is formed by joining members 14A, 14B and 14C formed of three different materials having different thermal expansion coefficients. When the thermal expansion coefficients of the members 14A, 14B and 14C are $\alpha_1$, $\alpha_2$ and $\alpha_3$ and the lengths are $l_1$, $l_2$ and $l_3$ respectively, the thermal expansion coefficient $\alpha$ of the entire probe part 14 is expressed by an expression (17) below.

$$\alpha=(\alpha_1 l_1+\alpha_2 l_2+\alpha_3 l_3)/(l_1+l_2+l_3) \quad (17)$$

Generally, the thermal expansion coefficient is a value intrinsic to the material and it is difficult to adjust it to an arbitrary value. Then, by combining the plurality of materials and adjusting the lengths of the individual materials, it becomes possible to adjust the thermal expansion coefficients of the probe part 14, the scale 22 and the swing shaft fixing part 24 to arbitrary values. Thus, the measurement device which satisfies the condition of $\beta=\alpha+\gamma$ is easily created.

Second Embodiment

Figure 5:
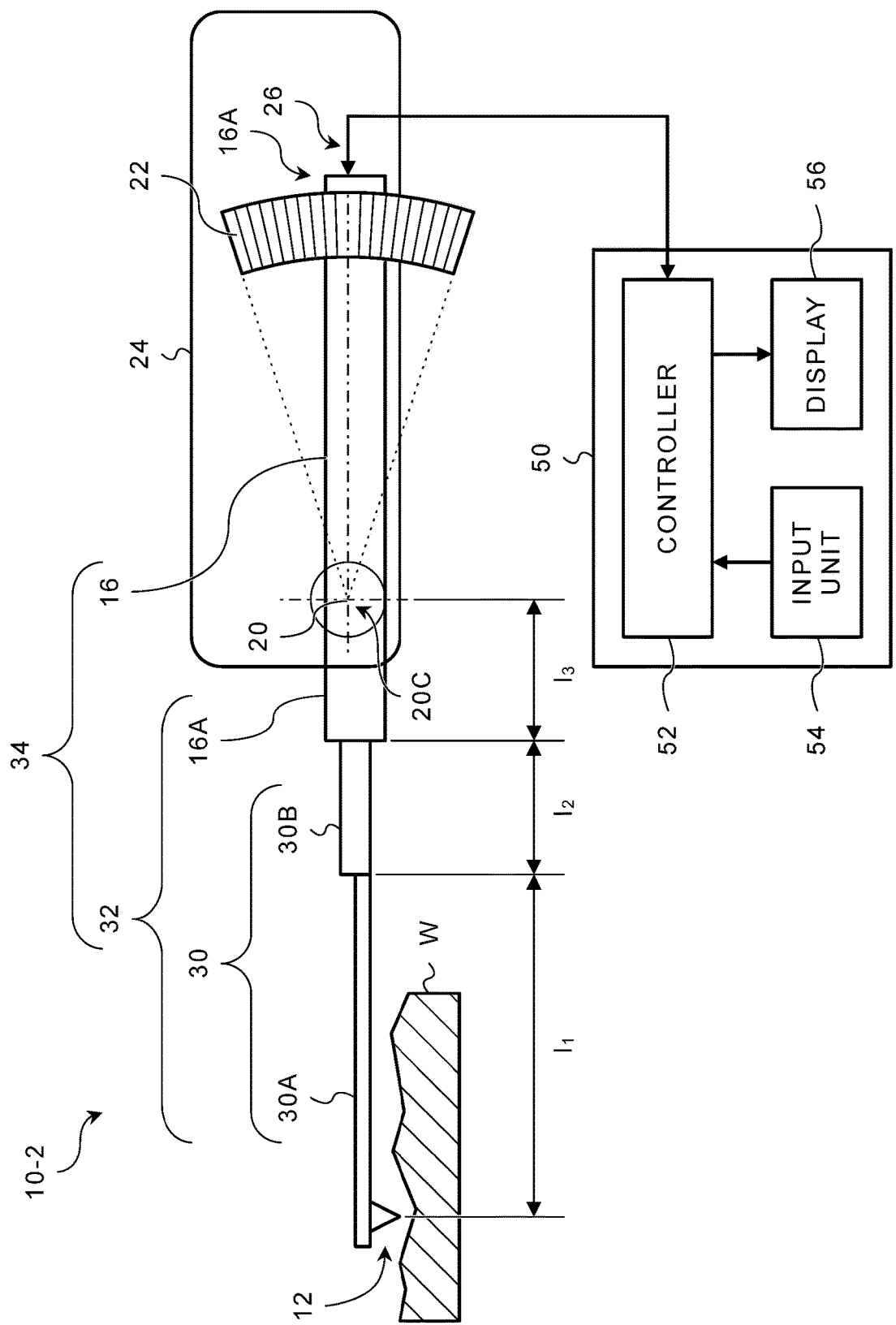
FIG. 5 is a diagram illustrating a measurement device according to a second embodiment of the presently disclosed subject matter.

FIG. 5 is a diagram illustrating a measurement device according to the second embodiment of the presently disclosed subject matter. In the following explanation, same signs are attached for the configuration similar to the embodiment described above and the explanation is omitted.

A measurement device 10-2 according to the present embodiment includes an exchangeable probe 30 attachable and detachable to/from the measurement device 10-2, instead of the probe part 14.

The exchangeable probe 30 includes a first member 30A provided with the probe 12 and a second member 30B. A proximal end part of the second member 30B has such a shape that attachment (for example, engagement and fitting) to a probe attaching base part 16A is possible. In the present embodiment, the exchangeable probe 30 and the probe attaching base part 16A form a probe part 32 together, and the probe part 32 and the arm part 16 form a swing part 34 together.

The thermal expansion coefficients of the first member 30A and the second member 30B are $\alpha_1$ and $\alpha_2$ respectively, the lengths are $l_1$ and $l_2$, the thermal expansion coefficient of the probe attaching base part 16A is $\alpha_3$ and the length (the length between a left end part in the figure and the swing center 20C of the swing shaft 20) is $l_3$. In this case, similarly to the modification 2, the thermal expansion coefficient $\alpha$ of the entire probe part 32 formed of the exchangeable probe 30 and the probe attaching base part 16A is expressed by an expression (18) below.

$$\alpha=(\alpha_1 l_1+\alpha_2 l_2+\alpha_3 l_3)/(l_1+l_2+l_3) \quad (18)$$

Thus, when the condition to be satisfied is $\beta=\alpha+\gamma$, a condition of an expression (19) below should be satisfied.

$$(\alpha_1 l_1+\alpha_2 l_2+\alpha_3 l_3)/(l_1+l_2+l_3)=\beta-\gamma \quad (19)$$

According to the present embodiment, similarly to the modification 2, the thermal expansion coefficient $\alpha$ can be adjusted to an arbitrary value by the combination of the members configuring the exchangeable probe 30 and the length. In addition, according to the present embodiment, since the thermal expansion coefficient $\alpha$ can be adjusted only by the exchangeable probe 30, the influence exerted on the measurement result by the ambient temperature T can be suppressed even in an existing measurement device (the measurement device for which γ and β are not adjusted). Furthermore, in the present embodiment, a margin may be given to β similarly to the modification 1.

In the present embodiment, it is preferable that the shape of the probe attaching base part 16A is turned to such a shape (for example, a diameter and the shape of a fitting hole) that only the exchangeable probe 30 satisfying the condition of the expression (19) is attachable. Thus, an exchangeable probe not suitable for suppressing the influence exerted on the measurement result by the ambient temperature T can be prevented from being attached to the measurement device.

Third Embodiment

While the condition that the thermal expansion coefficient α of the probe part 14, the thermal expansion coefficient β of the arm part 16 and the thermal expansion coefficient γ of the scale 22 satisfy is obtained in order to suppress the influence exerted on the measurement result by the change of the ambient temperature in the embodiment described above, it is also possible to measure the temperature change amount ΔT of the ambient temperature T and correct the measurement result using the temperature change amount ΔT.

Figure 6:
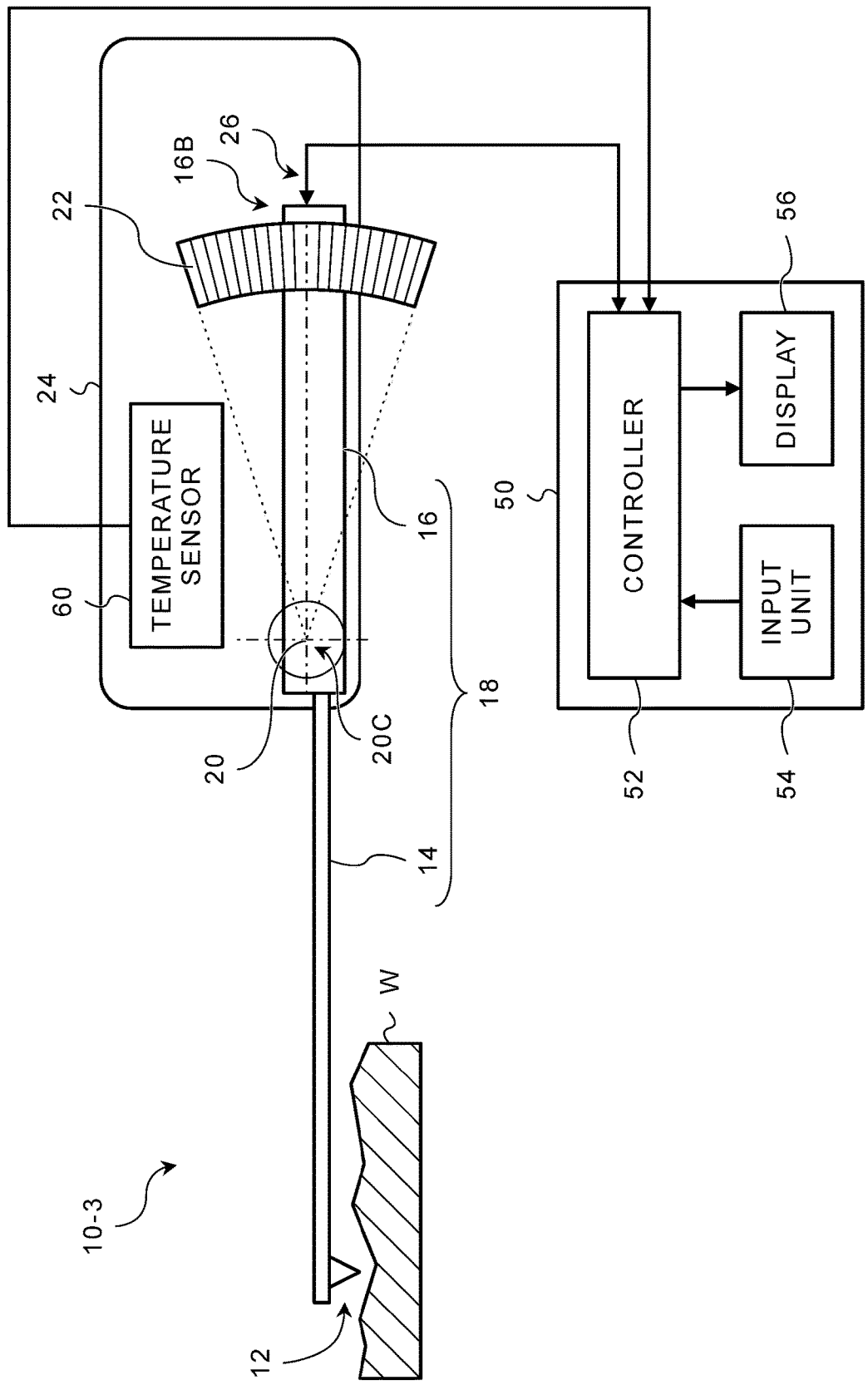
FIG. 6 is a diagram illustrating a measurement device according to a third embodiment of the presently disclosed subject matter.

FIG. 6 is a diagram illustrating a measurement device according to the third embodiment of the presently disclosed subject matter. In the following explanation, the same signs are attached for the configuration similar to the embodiment described above and the explanation is omitted.

A measurement device 10-3 according to the present embodiment includes a temperature sensor 60. The temperature sensor 60 is for measuring the ambient temperature (air temperature) of an environment where measurement is performed using the measurement device 10-3, and is provided on a surface of a casing of the measurement device 10-3, for example.

Here, as the temperature sensor 60, it is also possible to use a contact type or non-contact type temperature sensor (for example, a radiation thermometer or a thermistor) for measuring the temperature (for example, a surface temperature) of at least one of the probe part 14 and the arm part 16 as the ambient temperature.

In the present embodiment, the controller 52 acquires a measured value of the ambient temperature T from the temperature sensor 60 when measuring the displacement $x_F$ of the distal end part 14E of the probe part 14, and stores the displacement $x_F$ and the ambient temperature T in association with each other in the storage. Then, the controller 52 calculates the actual displacement $x_T$ of the distal end part 14E of the probe part 14 based on the displacement $x_F$ (measured value) and the temperature change amount ΔT of the ambient temperature T. Specifically, the actual displacement $x_T$ of the distal end part 14E of the probe part 14 is calculated from the displacement $x_F$ (measured value) using a correction coefficient c indicated in an expression (20) below.

$$c \cdot x_F = x_T \quad (20)$$

As already described, the displacement $x_F$ of the distal end part 14E of the probe part 14 in the case of taking the thermal expansion into consideration is obtained by the expression (11).

$$x_F \approx L_0 \cdot \sin\theta \{1+(\beta-\gamma)\Delta T \cdot \cos\theta\} \quad (11)$$

On the other hand, the actual displacement $x_T$ of the distal end part 14E of the probe part 14 is obtained by the expression (4).

$$x_T = L \cdot \sin\theta = L_0 \cdot \sin\theta(1+\alpha\Delta T) \quad (4)$$

When the expression (11) and the expression (4) are substituted for the expression (20) and the approximation (cos θ≈1) for which θ is the minute angle is used, an expression (21) below is obtained.

$$c = x_T/x_F$$

$$= (1+\alpha\Delta T)/\{1+(\beta-\gamma)\Delta T \cdot \cos\theta\}$$

$$\approx (1+\alpha\Delta T)/\{1+(\beta-\gamma)\Delta T\} \quad (21)$$

That is, when the approximation for which θ is the minute angle is used, the correction coefficient c is obtained by the thermal expansion coefficient α of the probe part 14, the thermal expansion coefficient β of the arm part 16, the thermal expansion coefficient γ of the scale 22 and the temperature change amount ΔT of the ambient temperature T.

By substituting the correction coefficient c expressed by the expression (21) for the expression (20) and correcting the displacement $x_F$ (measured value) of the distal end part 14E of the probe part 14, the actual displacement $x_T$ of the distal end part 14E can be calculated. Thus, the influence exerted on the measurement result by the change of the ambient temperature can be suppressed.

REFERENCE SIGNS LIST

10, 10-1, 10-2, 10-3 . . . measurement device, 12 . . . probe, 14 . . . probe part, 16 . . . arm part, 18 . . . swing part, 20 . . . swing shaft, 22 . . . scale, 24 . . . swing shaft fixing part, 26 . . . scale head, 26P . . . scale head read point, 30 . . . exchangeable probe, 32 . . . probe part, 34 . . . swing part, 50 . . . control device, 52 . . . controller, 54 . . . input unit, 56 . . . display, 60 . . . temperature sensor

What is claimed is:

1. A measurement device comprising:
   a probe part including a probe configured to measure a surface of an object to be measured and is attached so as to swing around a swing center according to a shape of the surface of the object to be measured;
   a scale configured to measure displacement by swinging of the probe part;
   a scale head configured to read a scale mark of the scale; and
   an arm part to which the probe part is attached, the arm part being attached so as to swing around the swing center integrally with the probe part, and the scale being attached to the arm part,
   wherein, when thermal expansion coefficients of the probe part, the arm part and the scale are α, β and γ respectively, the measurement device satisfies a condition of $(\alpha+\gamma)-1/2\alpha \leq \beta \leq (\alpha+\gamma)+1/2\alpha$.

2. The measurement device according to claim 1, wherein the thermal expansion coefficients of the probe part, the arm part and the scale satisfy a condition of β=α+γ.

3. The measurement device according to claim 1, wherein the scale is a circular arc scale formed in a circular arc shape along a swing direction of the arm part.

4. The measurement device according to claim 1, wherein
at least one of the probe part, the arm part and the scale is formed of a plurality of members having different thermal expansion coefficients, and
materials and lengths of the plurality of members are adjusted so as to satisfy the condition.

5. A measurement device comprising:
a probe part including a probe configured to measure a surface of an object to be measured and attached so as to swing around a swing center according to a shape of the surface of the object to be measured;
a scale configured to measure displacement by swinging of the probe part;
a scale head configured to read a scale mark of the scale;
an arm part to which the probe part is attached, the arm part being attached so as to swing around the swing center integrally with the probe part, and the scale being attached to the arm part;
a temperature sensor configured to measure an ambient temperature; and
a controller configured to calculate actual displacement $x_T$ of a distal end part of the probe part by following expressions, when thermal expansion coefficients of the probe part, the arm part and the scale are $\alpha$, $\beta$ and $\gamma$ respectively, a measured value of displacement of the distal end part of the probe part is $x_F$, and a change amount of the ambient temperature when measuring the measured value $x_F$ is $\Delta T$, $$x_T = c x_F$$

$$c = (1+\alpha\Delta T)/\{1+(\beta-\gamma)\Delta T\}.$$

* * * * *